3,790,646
OIL-RESISTANT POLYMER COMPOSITION
Tetsu Ohishi, 6-16-9 Shimomeguro, Tokyo, Japan; Hiroshi Fukushima, 2-32-9 Ikego, Zushi, Japan; and Hideo Fukuda, 2975-20, Seya-cho, Yokohama, Japan
No Drawing. Filed Apr. 24, 1972, Ser. No. 247,010
Claims priority, application Japan, May 1, 1971, 46/28,584; Nov. 5, 1971, 46/88,031
Int. Cl. C08d 5/04; C08f 29/08
U.S. Cl. 260—894      6 Claims

ABSTRACT OF THE DISCLOSURE

An oil-resistant polymer composition comprising (I) 5 to 50% by weight of a copolymer consisting essentially of 20 to 50% by weight of acrylonitrile, 50 to 80% by weight of a diene selected from butadiene and isoprene and 0.1 to 10% by weight of an $\alpha,\beta$-ethylenically unsaturated carboxylic acid and having a number average molecular weight of about 500 to 10,000 and (II) 95 to 50% by weight of an acrylonitrile/butadiene copolymer.

---

This invention relates to an oil-resistant polymer composition, and more specifically to an oil-resistant polymer composition comprising a copolymer composed essentially of acrylonitrile, butadiene or isoprene and an $\alpha,\beta$-ethylenically unsaturated carboxylic acid and an acrylonitrile-butadiene copolymer.

When rubber is used in a state of contact with chemicals or solvents, changes in the volume, strength and elasticity modulus become important problems, and these phenomena are being investigated as important subjects. Rubber compositions have been selected for practical purposes so that these properties are suitable for the desired end use.

When rubber comes in contact with a solvent, it is frequently broken within a short period of time under a low stretch which would not cause breakage in air. This phenomenon of crack growth in a solvent is known as "solvent crack" in the field of plastics. However, there have been only a few reports on studies made on this phenomenon in rubber.

The occurrence of solvent crack should naturally be avoided in the case of rubber materials to be used in contact with gasoline, and therefore rubber compositions based mainly on an acrylonitrile-butadiene copolymer are widely used. As a result of the social demand for excluding a lead ingredient from gasoline, it is expected that the content of an aromatic ingredient (the aromatic content of gasoline now in use is estimated at about 50%) will be increased. The solvent crack phenomenon would therefore becomes a practical problem even with the acrylonitrile-butadiene copolymer compositions. Having assumed such a situation, extensive investigation has been conducted on the solvent crack phenomenon of rubber in a mixed solvent of iso-octane and toluene in a ratio of 40:60. As a result, it has been found that a standard acrylonitrile-butadiene copolymer composition now in wide use has a crack break life, as measured under the conditions to be described, of only less than one minute, and cannot withstand practical use.

It is therefore an object of this invention to provide an oil-resistant polymer composition which undergoes extremely small crack growth when in contact with highly aromatic solvents.

Other objects of this invention will become apparent from the following description.

According to this invention, a composition is provided comprising 5 to 50% by weight of (I) a copolymer consisting essentially of 20 to 50% by weight of acrylonitrile, 50 to 80% by weight of a diene selected from the group consisting of butadiene and isoprene and 0.1 to 10% by weight of an $\alpha,\beta$-ethylenically unsaturated carboxylic acid and having a number average molecular weight of about 500 to 10,000 and (II) 95 to 50% by weight of an acrylonitrile-butadiene copolymer.

When the polymer composition was tested as to it solvent crack phenomenon under the conditions to be described, it was found to have a crack break life of longer than about 5 minutes, thus showing a great improvement. Therefore, the polymer composition of this invention can find utility in a wide range of applications which require resistance to highly aromatic solvents. Since the composition of the invention has far superior resistance to solvent crack when compared with conventional acrylonitrile-butadiene copolymer compositions, it can sufficiently withstand use under severe service conditions such as in gasoline having a high aromatic content.

The low-molecular-weight (about 500 to 10,000) ternary copolymer of acrylonitrile, butadiene or isoprene, and an $\alpha,\beta$-unsaturated carboxylic acid used in the invention is produced in accordance with a usual emulsion-polymerization recipe. The polymerization temperature may be low (about 0° C.) or high (30 to 80° C.). Therefore, the polymerization initiator may be a Redox catalyst or a free-radical catalyst such as potassium persulfate and organic peroxides. Since the polymerization system is acidic, any emulsifier which has an emulsifying action under acidic conditions may be used. It is preferred that an aqueous emulsifier solution should be acidified prior to the feeding of monomers. Typical examples of a molecular-weight modifier that can be used is a mercaptan such as tertiary dodecylmercaptan, and its amount is controlled so that a copolymer of the desired low molecular weight can be obtained. Chemicals such as the monomers, molecular-weight modifier and emulsifier may be charged any time before the initiation of reaction, or if desired, in divided portions. The polymerization can be employed either batchwise or continuously. As the $\alpha,\beta$-ethylenically unsaturated carboxylic acid, at least one mono- or dicarboxylic acid selected, for example, from acrylic acid, methacrylic acid, maleic acid and itaconic acid may be used. The proportion of the carboxylic acid to be polymerized is from 0.1 to 10% by weight. If the proportion is less than 0.1% by weight, the solvent crack resistance of the polymer composition cannot be improved, and if it exceeds 10% by weight, the solvent crack resistance and other properties are undesirably deteriorated.

The polymer composition of this invention is an admixture of (I) 5 to 50 parts by weight of this low-molecular-weight polymer and (II) 95 to 50 parts by weight of an ordinary acrylonitrile-butadiene copolymer having an acrylonitrile content of about 20 to 50% by weight, the sum of (I) and (II) being 100 parts by weight. If the amount of copolymer (I) is less than 5 parts by weight, the solvent crack resistance is not improved, and if it exceeds 50 to parts by weight, the mechanical properties of the composition are lowered. These two polymers (I) and (II) may be mixed in the form of latex or by a mixer such as roll or Banbury mixer or in a solvent.

The coagulation of the latex of polymer (I) and that of polymer (II) can be carried out in a customary manner. The methods generally in practice involve the use of an inorganic metal salt such as chlorides and sulfates of sodium, calcium, magnesium or aluminum or an organic metal salt such as potassium tartrate as a coagulating agent, with or without the conjoint use of an inorganic acid such as sulfuric acid, hydrochloric acid, phosphoric acid or silicic acid or an organic acid such as acrylic acid, citric acid or tartaric acid. The amount of the metal salt is 1 to 5% based on the solids content of the rubber in the latex, and the amount of the acid is 0 to 6% by weight on the same basis. The solvent rack resistance of the composition of this invention can be further improved by using as a coagulation agent an $\alpha,\beta$-ethylenically unsaturated carboxylic acid such as an acrylic acid polymer, a methacrylic acid polymer or an acrylic acid-methacrylic acid copolymer or its ammonium salt and the metal salt in the coagulation of the latex of copolymer (I) or a mixture of the copolymer latex (I) and the copolymer latex (II). This coagulation agent is especially preferable since it can inhibit the corrosion of metal machinery in the dehydration and drying process. If desired, this coagulation agent can be used conjointly with the above-mentioned known acid. In this case, the amount of the acid may sufficiently be as small as up to 2% by weight, and there is substantially no problem of the corrosion of the machinery.

The polymer of an $\alpha,\beta$-ethylenically unsaturated carboxylic acid used to coagulate the copolymer latex is a polymer or copolymer obtained by polymerizing an $\alpha,\beta$-ethylenically unsaturated mono- or dicarboxylic acid having 3 to 5 carbon atoms, such as acrylic acid, methacrylic acid, fumaric acid, maleic acid or itaconic acid, in an aqueous medium using potassium persulfate, ammonium persulfate or a Redox catalyst. The acrylic acid polymer, methacrylic acid polymer and acrylic acid/methacrylic acid copolymer are preferred. The ammonium salts of these polymers obtained by neutralizing them with aqueous ammonia or ammonia to a neutrality of 0 to 1 can also be used. Even when the ammonium salt having a neutrality of 1 is used, a part of the ammonium salt sometimes remains in the form of an acid depending upon its pH at the time of coagulating the latex.

It is to be noted in this connection that these acid polymers and their ammonium salts are usually employed as binders, cosmetics, aqueous paints, adhesives, thickners, etc.

The viscosity average degree of polymerization $(\overline{p})$ of these polymers or ammonium salts thereof (as determined by the method described in Herman F. Mark, Encyclopedia of Polymer Science and Technology, vol. 1, page 216, 1964) is usually 50 to 200,000, preferably 500 to 20,000. The amount of the polymer is 0 to 6% by weight, preferably 0.5 to 3% by weight, based on the solids content of the copolymer in the latex. Amounts in excess of 6% by weight sometimes cause a marked rise in the viscosity of the latex, and are undesirable and uneconomical.

The order of adding the coagulating agent to the latex is optional. For example, the acid polymer is first added to the latex, and the metal salt or the metal salt and the acid are added at the time of coagulation. Or all of the coagulating agents may be added separately. However, when the acid is mixed with the metal salt prior to addition, both react with each other to form a water-insoluble acid polymer, especially when the metal is of a divalent nature. To overcome this problem, the acid is used in an increased amount to reduce the pH. If required, a coagulating assistant such as glue and polyamine may be conjointly used. The coagulation is performed at room temperature or at an elevated temperature according to the usual method. Subsequent water-washing and drying give a rubber composition.

The polymer composition so prepared is vulcanized in a customary manner using sulfur or a peroxide. In addition to the vulcanizing agent, ordinary additives such as a reinforcing agent, extender, softening agent, anti-oxidant or pigment can also be added.

The polymer composition of this invention, like the ordinary acrylonitrile-butadiene copolymer, can be used in a wide variety of fields either alone or in admixture with natural or synthetic rubber in the form of latex or solid, and finds special utility in applications which require good resistance to solvent crack, such as the production of fuel hoses, packings, oil seals, gaskets, belts, rolls for spinning frames, printing rolls or diaphragms.

The invention will now be described specifically by the following non-limitative examples. In each of the examples, all parts and percentages are by weight.

EXAMPLE 1

Polymerization was carried out in accordance with the recipe shown in Table 1 using an autoclave having an inner capacity of about 12 liters at 35° C. until the conversion of the monomer reached 85%. After completion of the reaction, a commercially available anti-oxidant was added to the latex, and the polymer latex was coagulated with an aqueous solution of aluminum sulfate, followed by washing with water and drying in a vacuum dryer to form a liquid copolymer. The combined acrylonitrile content (percent) of the resulting copolymer was measured by the Kjeldahl method. The combined carboxyl group content (moles of COOH per 100 parts of rubber) was determined by the titration method. The number average molecular weight was measured by an ebulliometer. The properties of the polymer are shown in Table 2.

TABLE 1

| | Parts |
|---|---|
| Monomers (see Table 2) | 100 |
| Water | 250 |
| Sodium dibutylnaphthalenesulfonate | 3.0 |
| Sodium dodecylbenzenesulfonate | 1.0 |
| Sodium sulfate | 0.2 |
| Sulfuric acid | 0.1 |
| Potassium persulfate | 0.3 |
| Tertiary dodecylmercaptan (varying amounts, see Table 2). | |

TABLE 2

| | Polymerization conditions | | | | Properties of the polymer | | |
|---|---|---|---|---|---|---|---|
| | Amounts of monomers charged (parts) | | | Amount of tert.-dodecyl-mercaptan (parts) | Combined acrylo-nitrile (percent) | Combined carboxyl group (ephr.) | Number average molecular weight |
| Samples | Acrylo-nitrile | Butadiene | Methacrylic acid | | | | |
| A | 45 | 55 | | 10.0 | 42.5 | | 1,880 |
| B | 45 | 54.5 | 0.5 | 10.0 | 42.4 | 0.005 | 1,910 |
| C | 45 | 53 | 2.0 | 10.0 | 43.1 | 0.022 | 1,870 |
| D | 45 | 48.5 | 6.5 | 10.0 | 43.5 | 0.075 | 2,020 |
| E | 45 | 45 | 10.0 | 10.0 | 43.2 | 0.110 | 1,980 |
| F | 35 | 63 | 2.0 | 9.0 | 33.8 | 0.024 | 1,930 |
| G | 50 | 50 | | 12.0 | 45.8 | | 1,890 |
| H | 50 | 48 | 2.0 | 12.0 | 45.2 | 0.021 | 1,910 |
| I | 45 | 53 | 2.0 | 17.0 | 42.5 | 0.023 | 1,150 |
| J | 45 | 53 | 2.0 | 3.5 | 42.8 | 0.023 | 6,010 |
| K | 45 | 53 | a 2.0 | 10.0 | 43.3 | 0.025 | 1,980 |
| L | 45 | b 53 | 2.0 | 10.0 | 43.2 | 0.022 | 2,020 | a Acrylic acid was used instead of methacrylic acid.
b Isoprene was used instead of butadiene.

100 parts of a mixture of the resulting liquid copolymer and a commercially available acrylonitrile-butadiene copolymer, 5 parts of zinc oxide, 1 part of stearic acid, 0.3 part of sulfur, 65 parts of FEF carbon black, 15 parts of dioctyl phthalate, and 20 parts of tetramethyl thiuram monosulfide were mixed on a roll and the mixture was vulcanized for 30 minutes at 150° C. The properties and the solvent crack resistance of the resulting vulcanized products are shown in Tables 3 to 5.

The measurement of the solvent crack resistance was made as follows:

Indicator lines were drawn at intervals of 10 mm. on a rectangular test piece 10 mm. wide and 2 mm. thick. Midway between two adjoining indicator lines a crack 2 mm. thick was provided by a razor in a direction parallel to the indicator lines extending to the back thereof. The test piece was mounted to jigs capable of being extended at a stretch ratio of 100%. At this time, the distance between the jigs was adjusted constantly to 30 mm. The test piece was in a taut state in a test solvent (a mixture of iso-octane/toluene in a volume ratio of 40:60) at 30° C., and the time that elapsed until the break of the sample was measured.

TABLE 5

| | Experiments No. | | | |
|---|---|---|---|---|
| | 14 | 15 | 16 | 17 |
| Amount of the acrylonitrile-butadiene copolymer (parts) a | 85 | 70 | 80 | 80 |
| Liquid copolymer: | | | | |
| Sample No. | I | J | K | L |
| Parts by weight | 15 | 30 | 20 | 20 |
| Properties of the vulcanized product: | | | | |
| Tensile strength (kg./cm.²) | 140 | 150 | 137 | 72 |
| Elongation (percent) | 560 | 480 | 390 | 120 |
| 300% modulus (kg./cm.²) | 88 | 111 | 96 | 526 |
| Hardness (JIS) | 60 | 67 | 63 | 169 |
| Resistance to solvent crack (break time) | 27'00" | 16'20" | 19'23" | 5'43" | a Hycar 1041.

As is seen from the data shown in Table 5, polymer compositions having excellent resistance to solvent crack can be obtained when the molecular weight of the liquid copolymer was changed (Experiments Nos. 14 and 15), when acrylic acid was used instead of methacrylic acid (Experiment No. 16), and when isoprene was used instead of butadiene (Experiment No. 17).

TABLE 3

| | Experiment No. | | | | | |
|---|---|---|---|---|---|---|
| | 1 (control) | 2 (control) | 3 | 4 | 5 | 6 |
| Amount in parts of acrylonitrile butadiene copolymer a | 100 | 80 | 80 | 80 | 80 | 80 |
| Liquid copolymer: | | | | | | |
| Sample No. | | A | B | C | D | E |
| Parts | | 20 | 20 | 20 | 20 | 20 |
| Properties of the vulcanized product: | | | | | | |
| Tensile strength (kg./cm.²) | 171 | 139 | 142 | 146 | 158 | 167 |
| Elongation (percent) | 480 | 530 | 470 | 460 | 480 | 420 |
| 300% modulus (kg./cm.²) | 137 | 106 | 108 | 110 | 114 | 124 |
| Hardness (JIS) | 67 | 63 | 65 | 64 | 68 | 69 |
| Resistance to solvent crack (break time) | 0'43" | 1'54" | 4'41" | 12'04" | 10'45" | 9'23" | a Hycar 1041 (product of Nippon Zeon Co., Ltd.).

As is seen from Table 3, the acrylonitrile-butadiene copolymer alone has poor resistance to solvent crack. The solvent crack resistance of a mixture of the acrylonitrile-butadiene copolymer with a liquid copolymer free from a carboxyl group can be improved only to a slight extent (see Experiment No. 2). By contrast, the polymer compositions of the present invention (Examples Nos. 3 to 6) have extremely good solvent crack resistance.

EXAMPLE 2

Polymerization was performed at 5° C. in accordance with the polymerization recipe shown in Table 6 below. When the conversion reached at least 85%, a short stop was added to stop the polymerization reaction, followed by addition of a commercially available antioxidant to form a latex having a combined acrylonitrile content of 42.5% and a Mooney viscosity (100° C. $ML_{1+4}$) of 65.0.

TABLE 4

| | Experiment No. | | | | | | |
|---|---|---|---|---|---|---|---|
| | 7 | 8 | 9 (control) | 10 | 11 | 12 (control) | 13 |
| Amount of acrylonitrile-butadiene copolymer (parts) a | 90 | 60 | | | 80 | 80 | 80 |
| Amount of acrylonitrile-butadiene copolymer (parts) b | | | 100 | 80 | | | |
| Liquid copolymer: | | | | | | | |
| Sample No. | C | C | | C | F | G | H |
| Parts | 10 | 40 | | 20 | 20 | 20 | 20 |
| Properties of the vulcanization product: | | | | | | | |
| Tensile strength (kg./cm.²) | 149 | 126 | 166 | 143 | 152 | 142 | 139 |
| Elongation (percent) | 480 | 520 | 510 | 490 | 460 | 510 | 470 |
| 300% modulus (kg./cm.²) | 120 | 94 | 141 | 118 | 109 | 108 | 118 |
| Hardness (JIS) | 68 | 63 | 69 | 67 | 65 | 63 | 66 |
| Resistance to solvent crack (break time) | 9'13" | 17'29" | 0'58" | 10'47" | 8'51" | 1'39" | 12'07" | a Hycar 1041.  b Hycar 1042 (product of Nippon Zeon Co., Ltd.).

As is seen from the results shown in Table 4, polymer compositions having excellent resistance to solvent crack can be obtained when the mixing proportions of the liquid copolymers were changed (Experiment Nos. 7, 8 and 4), and when the combined acrylonitrile content of the acrylonitrile butadiene copolymer or the carboxyl group-containing liquid copolymer was changed (Experiments Nos. 10, 11 and 13).

TABLE 6

| | Parts |
|---|---|
| Acrylonitrile | 45 |
| Butadiene | 55 |
| Water | 230 |
| Sodium alkylnaphthalenesulfonate | 1.5 |
| Sodium alkylbenzenesulfonate | 2.0 |
| Sodium (tertiary) phosphate | 0.2 |
| Ferrous sulfate | 0.01 |
| Tertiary dodecyl mercaptan | 0.50 |
| Sodium ethylenediaminetetraacetate | 0.03 |
| Sodium formaldehyde sulfoxylate | 0.06 |
| p-Methane hydroperoxide | 0.05 |

A mixture of 80 parts by weight (as rubber solids content) of this latex and 20 parts by weight (as rubber tables is based on 100 parts by weight of the rubber solids content of the latex.

TABLE 8

| | Experiment No. | | | | |
|---|---|---|---|---|---|
| | 1 (control) | 2 | 3 | 4 | 5 |
| Coagulating agent: | | | | | |
| Metal salt (2.7 parts) | Aluminum sulfate | Aluminum sulfate | Aluminum sulfate | Calcium chloride | Calcium chloride |
| Amount of the acrylic acid polymer | 0 | 0.9 | 1.8 | 1.8 | 2.7 |
| Properties of the vulcanization product: | | | | | |
| Tensile strength (kg./cm.$^2$) | 124 | 117 | 118 | 125 | 130 |
| Elongation (percent) | 410 | 420 | 440 | 410 | 440 |
| 300% modulus (kg./cm.$^2$) | 103 | 94 | 94 | 105 | 103 |
| Hardness (JIS) | 66–59 | 65–57 | 68–57 | 67–57 | 70–55 |
| Resistance to solvent crack at— | | | | | |
| 25° C | 3'09" | 7'23" | 6'03" | 6'16" | 6'46" |
| 40° C | 0'55" | 2'15" | 2'08" | 2'16" | 1'43" | solids content) of latex C obtained in Example 1 was coagulated using a coagulating agent shown in Table 8. A 5% aqueous solution of acrylic acid polymer (Aron A–10(H)), degree of polymerization about 2000 (product of Toa Gosei Kagaku Kogyo Co., Ltd.) was admixed with the latex in advance, and a 0.3% aqueous solution of a metal salt was admixed with such latex at the time of the coagulation treatment, whereby the latex was coagulated at 30 to 40° C. The resulting crumb was washed with water, and dried in vacuo at 50° C. for 24 hours to form a rubber. This rubber was compounded on a roll in accordance with the recipe shown in Table 7. The compounded composition was vulcanized for 10 minutes at 160° C.

TABLE 7

| | Parts by weight |
|---|---|
| Rubber | 100 |
| Zinc oxide (No. 3) | 5 |
| Stearic acid | 1.0 |
| Sulfur | 0.3 |
| MAF carbon black | 80 |
| Dioctyl phthalate | 20 |
| Tetramethylthiuramdisulfide | 2.0 |
| Cyclohexylbenzothiazyl sulfonamide | 0.2 |
| N-phenyl-N-isopropyl-p-phenylenediamine | 1.0 |

The solvent crack resistance of the resulting vulcanized product and its physical properties are shown in Table 8. The amount of the coagulating agent in the following As is clear from Table 8, the conjoint use of the metal salt and the crylic acid polymer gives rise to further improvement of the solvent crack resistance of the vulcanized rubber composition.

EXAMPLE 3

The procedure of Example 2 was repeated except that the coagulating agent used was changed as shown in Table 9. The solvent crack resistance was measured at 20° C. and 40° C. The results obtained are shown in Table 9.

TABLE 9

| | Experiment No. | |
|---|---|---|
| | 1 (control) | 2 |
| Coagulating agents (parts) | Calcium chloride (2.7) | Calcium chloride (2.7). |
| | Sulfuric acid (0.9) | Sulfuric acid (0.9). |
| | | Acrylic acid polymer (0.9). |
| Properties of the vulcanized products: | | |
| Tensile strength (kg./cm.$^2$) | 119 | 114. |
| Elongation (percent) | 500 | 560. |
| 300% modulus (kg./cm.$^2$) | 93 | 80. |
| Hardness (JIS) | 68–61 | 63–57. |
| Resistance to solvent crack at— | | |
| 20° C | 14'39" | 25'54". |
| 40° C | 2'24" | 6'35". |

As is seen from Table 9, the use of the acrylic acid polymer as a coagulating agent together with the metal salt and acid gives rise to greater improvement of the solvent crack resistance of the vulcanized rubber composition.

EXAMPLE 4

The mixed latex prepared in Example 2 was coagulated using a coagulating agent shown in Table 10 and washed with water. The resulting rubber crum containing about 40% of water was held between steel plates (SAE–1020), and allowed to stand in a gear oven for 20 hours at 100° C. The crumb and the steel plates were taken out, and the corrosion of the surfaces of the steel plates was judged by the naked eye. The results are shown in Table 10.

TABLE 10

| | Experiment No. | | | |
|---|---|---|---|---|
| | 1 (control) | 2 (control) | 3 (control) | 4 |
| Coagulating agent: | | | | |
| Metal salt (2.7 parts) | Aluminum sulfate | Aluminum sulfate | Aluminum sulfate | Aluminum sulfate. |
| Acid (2.7 parts) | Sulfuric acid | Phosphoric acid | Hydrochloric acid | Acrylic acid polymer. |
| Corrosion of the steelplates | Large | Considerably large | Large | Small. |

It is seen from Table 10 that the use of an acrylic acid polymer as one component of the coagulating agent leads to a remarkable improvement in the corrosion of steel by the rubber crumb.

EXAMPLE 5

In accordance with the polymerization recipe shown in Table 11, polymerization was performed at 35° C. When the conversion reached at least 85%, a short stop was added to stop the reaction. Then, a commercially available anti-oxidant was added to form a latex having a combined acrylonitrile content of 42.3% and a Mooney viscosity (100° C. $ML_{1+4}$) of 57.5.

TABLE 11

| | Parts |
|---|---|
| Acrylonitrile | 45 |
| Butadiene | 55 |
| Water | 250 |
| Sodium alkylnaphthalenesulfonate | 2.5 |
| Sodium alkylbenzenesulfonate | 1.0 |
| Sodium sulfate | 0.2 |
| Potassium persulfate | 0.3 |
| Tertiary dodecyl mercaptan | 0.52 |

A mixture of 80 parts by weight (as rubber solids content) of this latex with 20 parts by weight of latex C obtained in Example 1 was coagulated using a coagulating agent shown in Table 12.

A 5% aqueous solution of the ammonium salt of an acrylic acid polymer (Aron A–30, degree of polymerization about 2500, neutrality 1, product of Toa Gosei Kagaku Kogyo Co., Ltd.) was admixed with the above mixed latex in advance, and a 0.3% aqueous solution of the metal salt was added to the latex at the time of coagulation treatment, whereby the latex was coagulated at 30 to 40° C. The resulting crumb was washed with water, and dried in vacuo for 24 hours at 50° C. Thereafter, the resulting rubber was compounded on a roll in accordance with the compounding recipe shown in Table 7 above, and then press-vulcanized at 160° C. for 10 minutes. The properties and the resistance to solvent crack of the resulting vulcanized products are shown in Table 12.

TABLE 12

| | Experiment No. | | |
|---|---|---|---|
| | 1 (control) | 2 | 3 |
| Coagulating agent: | | | |
| Metal salt (4 parts) | Aluminum sulfate | Aluminum sulfate | Calcium chloride |
| Amount of ammonium salt of the acrylic acid polymer (parts) | 0 | 1.8 | 1.8 |
| Properties of the vulcanized product: | | | |
| Tensile strength (kg./cm.²) | 125 | 134 | 130 |
| Elongation (percent) | 430 | 500 | 47 |
| 300% modulus (kg./cm.²) | 103 | 108 | 106 |
| Hardness (JIS) | 66–59 | 68–57 | 67–57 |
| Resistance to solvent crack: | | | |
| 25° C | 3'20" | 12'10" | 14'13" |
| 40° C | 0'50" | 2'35" | 2'55" |

It is seen from Table 12 that the use of an ammonium salt of the acrylic acid polymer as one component of the coagulating agent gives rise to a rubber vulcanized product having superior resistance to solvent crack.

EXAMPLE 6

The procedure of Example 5 was repeated except that a coagulating agent shown in Table 13 was used. The properties of the resulting vulcanized product were rated. The resistance to solvent crack was measured at 17° C. and 40° C. The results are shown in Table 13.

TABLE 13

| | Experimental report | |
|---|---|---|
| | 1 (control) | 2 |
| Coagulating agent (parts) | Calcium chloride (4) Sulfuric acid (0.9) | Calcium chloride (2.7). Sulfuric acid (0.9). Ammonium salt of acrylic acid polymer (0.9). |
| Properties of the vulcanized product: | | |
| Tensile strength (kg./cm.²) | 113 | 109. |
| Elongation (percent) | 490 | 560. |
| 300% Modulus (kg./cm.²) | 98 | 94. |
| Hardness (JIS) | 68–61 | 63–57. |
| Resistance to solvent crack at— | | |
| 17° C | 13'15" | 21'30". |
| 40° C | 2'18" | 4'40". |

It is seen from Table 13 that the use of an ammonium salt in an acrylic acid polymer together with the metal salt and acid gives rise to greater improvement of the solvent crack resistance.

EXAMPLE 7

The procedure of Example 4 was repeated using the mixed latex employed in Example 5, and using the coagulating agents indicated in Table 14.

TABLE 14

| | Experiment No. | | |
|---|---|---|---|
| | 1 (control) | 2 (control) | 3 |
| Coagulating agent: | | | |
| Metal salt (4 parts) | Aluminum sulfate | Aluminum sulfate | Aluminum sulfate. |
| Acid or ammonium salt (2.7 parts) | Sulfuric acid | Hydrochloric acid | Ammonium salt of the acrylic acid polymer. |
| Extent of corrosion of the steel plate | Large | Large | Small. |

It is seen from Table 14 that the use of an ammonium salt of the acrylic acid polymer as one component of the coagulating agent gives rise to a remarkable improvement in the extent of corrosion of the steel plate by rubber.

What is claimed is:

1. An oil-resistant polymer composition consisting essentially of (I) 5 to 50% by weight of a ternary copolymer consisting essentially of 20 to 50% by weight of acrylonitrile, 50 to 80% by weight of a diene selected from butadiene and isoprene and 0.1 to 10% by weight of an α,β-ethylenically unsaturated mono- or di-carboxylic acid selected from acrylic acid, methacrylic acid, maleic acid and itaconic acid, and having a number average molecular weight of about 500 to 10,000 and (II) 95 to 50% by weight of an acrylonitrile/butadiene copolymer.

2. An oil-resistant polymer composition consisting essentially of (I) 5 to 50% by weight of a liquid copolymer, said liquid copolymer being prepared by coagulating a ternary copolymer latex with a number average molecular weight of about 500 to 10,000 consisting essentially of 20 to 50% by weight of acrylonitrile, 50 to 80% by weight of a diene selected from butadiene and isoprene and 0.1 to 10% by weight of an α,β-ethylenically unsaturated mono- or di-carboxylic acid selected from acrylic acid, methacrylic acid, maleic acid and itaconic acid, in the presence of a metal chloride, sulfate or tartrate and a polymer of an α,β-ethylenically unsaturated carboxylic acid selected from poly(acrylic acid), poly(methacrylic acid) and an acrylic acid-methacrylic acid copolymer or its ammonium salt and (II) 95 to 50% by weight of an acrylonitrile/butadiene copolymer.

3. The composition of claim 2 wherein said metal salt is aluminum sulfate or calcium chloride, and said α,β-ethylenically unsaturated carboxylic acid polymer is poly(acrylic acid).

4. An oil-resistant polymer composition consisting essentially of one obtained by mixing 5 to 50% by weight as solids content of (I) a latex of a ternary copolymer of a number average molecular weight of about 500 to 10,000 consisting essentially of 20 to 50% by weight of acrylonitrile, 50 to 80% by weight of a diene selected from butadiene and isoprene and 0.1 to 10% by weight of an α,β-ethylenically unsaturated mono- or di-carboxylic acid with 95 to 50% by weight as solids content and (II) a latex of an acrylonitrile/butadiene copolymer, and coagulating the resulting mixed latex in the presence of a metal chloride, sulfate or tartrate and an α,β-ethylenically unsaturated carboxylic acid polymer selected from poly(acrylic acid), poly(methacrylic acid) and an acrylic acid-methacrylic acid copolymer or its ammonium salt.

5. The composition of claim 4 wherein said metal salt is aluminum sulfate or calcium chloride, and said α,β-ethylenically unsaturated carboxylic acid polymer is poly(acrylic acid).

6. An oil-resistant vulcanized polymer composition obtained by vulcanizing the polymer composition of claim 1.

References Cited
UNITED STATES PATENTS

| | | | |
|---|---|---|---|
| 2,378,732 | 6/1945 | Semon et al. | 260—94.7 A |
| 3,063,961 | 11/1962 | Frank | 260—894 |

MURRAY TILLMAN, Primary Examiner

J. ZIEGLER, Assistant Examiner

U.S. Cl. X.R.

260—29.1 R, 29.7 D, PT, 94.7 R

UNITED STATES PATENT OFFICE
CERTIFICATE OF CORRECTION

Patent No. 3,790,646                    Dated February 5, 1974

Inventor(s) Tetsu OHISHI ET AL

It is certified that error appears in the above-identified patent and that said Letters Patent are hereby corrected as shown below:

In the Heading, insert the following: -- Assignors to Nippon Zeon Co., Ltd., Tokyo, Japan, a corporation of Japan -- .

Signed and sealed this 13th day of August 1974.

(SEAL)
Attest:

McCOY M. GIBSON, JR.            C. MARSHALL DANN
Attesting Officer               Commissioner of Patents